March 10, 1953  D. L. SPENDER ET AL  2,631,047
HOSE COUPLING
Filed Nov. 6, 1952
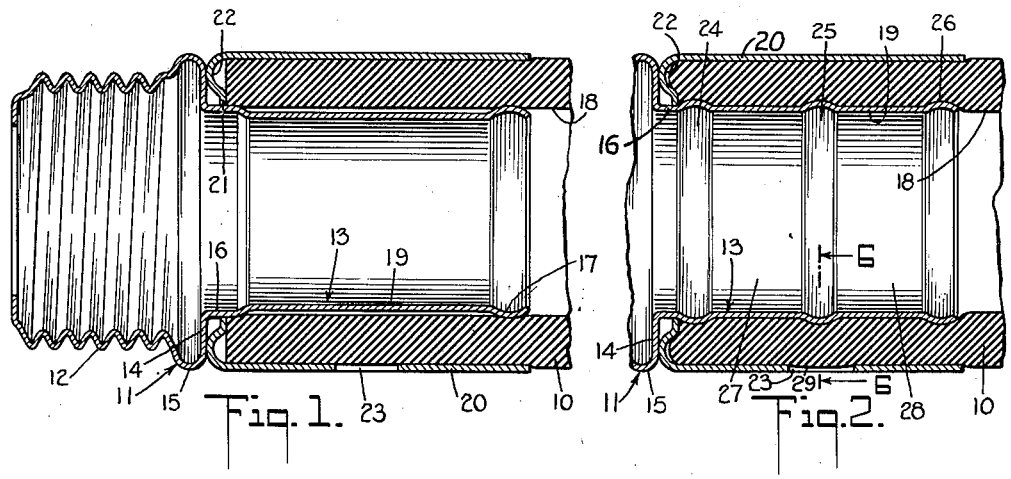
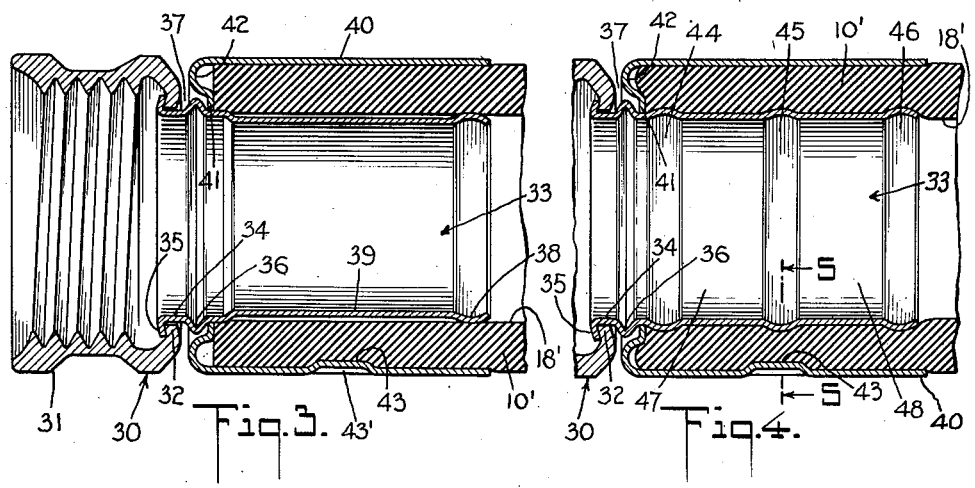
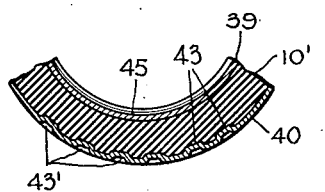
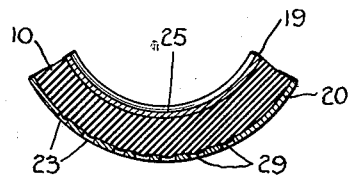
INVENTORS
DONALD L. SPENDER
GEORGE G. HOWARD
BY
Howard E. Thompson
ATTORNEY Patented Mar. 10, 1953

2,631,047

UNITED STATES PATENT OFFICE 2,631,047

HOSE COUPLING

Donald L. Spender, Wolcott, and George G. Howard, Waterbury, Conn., assignors to Scovill Manufacturing Company, Waterbury, Conn., a corporation of Connecticut Continuation of application Serial No. 36,308, July 1, 1948. This application November 6, 1952, Serial No. 319,032

4 Claims. (Cl. 285—84)

This invention relates to a hose coupling that is best adapted for use in connection with flexible garden hose.

The application is a continuation of our application, Serial No. 36,308, filed July 1, 1948, and which is now abandoned.

This coupling relates particularly to that type of coupling having a sheet metal ferrule continuously surrounding the end portion of a hose and an internal sheet metal nipple expanded outwardly to compress the hose material against the ferrule.

Such ferrules heretofore have had a flat end wall positioned more or less at right angles to the cylindrical wall of the ferrule, which flat wall had a tendency to radially expand and distort the adjacent end of the ferrule during the nipple expanding operation, and also one that was liable to be biased out of its normal position when the coupling was subjected to severe axial strains.

One important object of this invention is to improve the end wall of the ferrule so as to resist such outward biasing of the wall and providing for a firm engagement with a rib or shoulder on the expanded nipple to resist endwise separation of the coupling from the hose.

Another object of the invention is to provide an end wall construction of the ferrule which will absorb the expanding action of the nipple without distorting the adjacent end of the ferrule radially outwardly.

The novel features of the invention will be best understood from the following descriptions when taken together with the accompanying drawing, in which certain embodiments of the invention are disclosed, and in which the separate parts are designated by suitable reference characters in each of the views, and in which:

Fig. 1 is a vertical sectional view through a male type of hose coupling, made according to the invention, with the parts assembled preparatory for securing the coupling to the end of the hose.

Fig. 2 is a view similar to Fig. 1, showing the parts fully assembled and omitting part of the construction.

Fig. 3 is a view similar to Fig. 1, showing the invention applied to a female type of hose coupling.

Fig. 4 is a view similar to Fig. 3, showing the parts fully assembled and with part of the construction broken away.

Fig. 5 is a partial section on the line 5—5 of Fig. 4; and

Fig. 6 is a partial section on the line 6—6 of Fig. 2.

In Figs. 1 and 2 of the drawing we have shown the male member of a hose coupling and the ferrule employed in conjunction therewith in assemblage with the end of a rubber hose. In said views, 10 diagrammatically illustrates one end portion of a rubber hose, with which the male member 11 is adapted to be coupled. The male member 11 is initially formed as seen in Fig. 1, to provide a threaded plug end 12 with an integral nipple portion 13 which joins the plug end 12 in an annular connecting wall or shoulder 14, perpendicular to the axis of the member 11 and a large rounded wall portion 15.

Extending from the wall 14, the nipple 13 has an enlarged diameter portion 16, the inside diameter of which is common to the inside diameter of the hose 10. The nipple 13 has at its free end portion, an outwardly protruding rounded part 17 which is adapted to frictionally pass into the bore 18 of the hose so as to frictionally hold the member 11 in the end of the hose preparatory for the final assemblage operation. Between the wall portions 16 and 17, the wall 19 of the nipple is of materially less diameter than the bore 18 of the hose, thus facilitating free attachment of the member 11 with the hose.

In making the assemblage shown in Fig. 1 of the drawing, a ferrule 20 is first mounted on the end of the hose. This ferrule has at one end, an annular end wall portion 21 which is perpendicular to or normal to the axis of the hose, and which joins the outer wall of the ferrule in an outwardly axially extending annular beaded portion 22. In normally assembling the parts the protruding beaded portion 22 is adapted to be brought into firm engagement with the wall 14 of the member 11, and the end of the hose 10 is adapted to be forced over the wall portion 16 in the manner clearly seen in Fig. 1 of the drawing. As seen in Figs. 1, 2 and 6, the ferrule also has a plurality of circumferentially spaced openings 23 formed in the wall thereof, which openings may represent a design or symbol of any type or kind and are so arranged as to increase the gripping factor of the ferrule upon the hose as will appear later.

In finally assembling the parts, the wall portions 17 and 19 and part of the wall portions 16 are expanded outwardly to form three annular beads or rib projections 24, 25 and 26, as seen in Fig. 2 of the drawing. The wall 19 intermediate the beads 24 and 25, 25 and 26, is also expanded, so that these sections identified by the reference characters 27 and 28, in Fig. 2, have an inside diameter common with the inside diameter of the remaining portion of the wall 16 and at least equal to or greater than the inside diameter of the bore 18 of the hose. It will be noted that the center outwardly extended or beaded portion 25 is disposed in alinement with the apertures 23 in the ferrule and as a result of the assemblage shown in Fig. 2, part of the hose 10 will be expanded into the apertures 23, as seen at 29, in Fig. 2 and Fig. 6 of the drawing.

It has been found in practice that the particular shape of the end wall of the ferrule 20 in providing the rounded bead portion 22 joined directly to the end of the ferrule and terminating in an inner flat wall portion 21 increases considerably the strength of the coupling especially against any severe axial strains placed upon the hose and tending to pull it out of the coupling. Also where the nipple 13 joins the wall 14 of the plug end 12 there always exists an unavoidable fillet that heretofore kept the usual ferrule with perpendicular end flange from abutting solidly thereagainst. According to this construction the bead portion 22 is in solid contact with the shoulder wall 14 and the hole in the annular wall portion 21 can be made to have a closer fit about the nipple 13.

Another important feature of the bead 22 and end wall 14 is that it can readily absorb the expanding forces applied to the nipple 13 in the coupling assembly operation and prevent the adjacent cylindrical wall of the ferrule 20 from being bulged outwardly of its normal contour.

In Figs. 3 and 4 of the drawing, shown at 30, is the female member of the coupling. This member comprises a nut body 31 having an inwardly set annular flange 32 in connection with which is mounted a nipple portion 33. The nipple portion 33 has an enlarged diameter wall portion 34, generally similar to the wall portion 16. However, the wall portion 34 terminates at its free end in a circumferential outwardly extending and inwardly offset flange 35, engaging the flange 32 of the nut to prevent outward displacement of the nut from the nipple. The nut 31 is further held against displacement from the nipple by an outwardly extending or expanded rib portion 36 of V-shaped cross-sectional form. The rib 36 is sufficiently spaced from the flange 35 to provide an annular chamber 37 which facilitates free rotation of the nut 31 on the nipple.

The inner end of the nipple 33 has an outwardly extending rounded annular bead portion 38, similar to the portion 17 which provides for the frictional engagement of the nipple with a hose 10′ or the bore 18′ thereof. Between the wall portions 38 and 34, the nipple 33 has a small diameter wall portion 39, similar to the wall portion 19. At 40 is shown a ferrule which is generally similar to the ferrule 20. In other words, it has a perpendicular wall portion 41, similar to the wall 21 and an outwardly rounded and axially projecting beaded portion 42, similar to the portion 22. While the apertured structure, similar to the apertures 23 are applicable to the ferrule 40, in Figs. 3 and 4, the ferrule 40 is modified to the extent of showing inwardly pressed wall portions or indentations 43, which like the apertures 23, may give predetermined design or characterization to the ferrule. These portions 43 will extend into and embed themselves in the rubber hose and will also form keying means for retaining the ferrule against rotation on the hose.

In assembling the parts shown in Figs. 3 and 4, the ferrule 40 is first mounted on the end of the hose 10′ with the wall portion 41 abutting the end of the hose, after which the nipple 33 of the member 30 is frictionally passed into the bore 18′ until the wall portion 41 strikes the outwardly extending bead 36 and the end of the hose passes onto the wall portion 34, as illustrated in Fig. 3 of the drawing. It will be understood that the bead 36, in addition to holding the nut 31 against displacement from the nipple, also checks movement of the ferrule in the direction of the nut so as to maintain clearance between the nut and ferrule for free rotation of the nut 31.

After the parts have been assembled, as seen in Fig. 1, the wall portions of the nipple are now expanded to form three circumferential outwardly extending rounded beads or ribs 44, 45 and 46, the portions 47 and 48 of the wall 39 being also expanded so that the inside diameter of said portions 47 and 48 are substantially in alinement with the bore of the wall portion 34 and the bore 18′ of the hose 10′, thus providing full unobstructed flow through the hose, as with the construction as seen in Fig. 2 of the drawing. The annular enlargement 45 is positioned in alinement with the inwardly pressed portions 43 on the ferrule 40 so as to extend the hose into firm engagement with said pressed portions in retaining the ferrule against rotation on the hose, as is clearly illustrated in Fig. 5 of the drawing.

By constructing the nipples 13 and 33 with the long section of reduced diameter portions, as at 19 and 39, and providing the enlarged beaded ends 17 and 38 thereof, relatively free or easy coupling of the nipples with the end of the hose is provided, while at the same time, establishing a firm frictional engagement therewith. In other words, the frictional engagement is minimized to the extent of the enlargements 17 and 38 to the wall portions 16 and 34, the latter frictional engagement is minimized to the extent of the enlargements 17 and 38 to the wall portions 16 and 34, the latter frictional engagement occurring at the end of the final assemblage of the parts, as indicated in Figs. 1 and 3. It will thus be apparent that by expanding the major portion of the nipple, that is to say, the rounded enlargements, as at 24, 25 and 26, including the parts 27 and 28 in Fig. 2 and the comparable portions in Fig. 4, a firm and secure gripping of the hose is provided within the ferrule, the enlargements 26 and 46 being disposed inwardly of the inner end of the ferrules, as will clearly appear from a consideration of Figs. 2 and 4 of the drawing.

It will also be understood that by providing the keying means in the form of the openings 23, or inward projections 43, means is provided to securely retain the ferrules against rotation and the same means can be applied to both the male and female couplings. In other words, one standard construction would be employed by the manufacturer.

In referring throughout the specification and claims to a house coupling, it will be understood that reference is here made to flexible hose or tubular bodies of any type and kind in conjunction with which couplings of the kind under consideration can be used. It is well known, that flexible hose of the kind under consideration are composed of rubber, rubber fabrics, plastic, synthetic rubber and the like. As a matter of fact, the coupling in question can be utilized in conjunction with any type and kind of tubing where the body or wall structure of the tube is capable of flexure to the extent of expansion of the nipple, in the manner hereinbefore described.

We claim:

1. A hose coupling comprising an elongated tubular nipple adapted for insertion into one end portion of a rubber hose, a cylindrical sheet metal ferrule arranged on and continuously encircling said end of the hose and the tubular nipple therein, the ferrule at the end of the hose having a wall portion normal to the axis of the hose and an annular rounded bead portion extending axially outwardly with respect to said normal wall portion and merging smoothly into the cylindrical wall of the ferrule, the tubular nipple engaging the bore of the rubber hose by outwardly expanded annular ribs at the ends and intermediate the ends of said nipple, and said tubular nipple having a threaded coupling member outwardly of the hose and the ferrule, one of the tubular nipple annular ribs positioned in contact with said ferrule end wall portion to lock said ferrule against endwise movement relative to said tubular nipple.

2. A hose coupling as defined by claim 1 wherein said ferrule is formed with irregularities intermediate its ends presenting relatively sharp shoulders, and one of said tubular nipple annular ribs being positioned in transverse alignment with said ferrule irregularities to force the hose material into engagement with said irregularities.

3. A hose coupling comprising an elongated tubular nipple adapted for insertion into one end portion of a flexible hose and an enlarged threaded portion integrally joined to said nipple by a connecting shoulder wall, a cylindrical sheet metal ferrule arranged on and continuously encircling said end of the hose and the nipple therein, the ferrule at the end of the hose having a wall portion normal to the axis of the hose and an annular rounded bead portion extending axially outwardly with respect to said normal wall portion and merging smoothly into the cylindrical wall of said ferrule, the tubular nipple engaging the bore of the hose by outwardly expanded annular ribs at the ends and intermediate the ends of said nipple, one of said ribs being so positioned as to contact the ferrule end wall portion and firmly abut the apex of said bead portion against said shoulder wall.

4. A hose coupling comprising an elongated tubular nipple adapted for insertion into one end portion of a flexible hose, a cylindrical sheet metal ferrule arranged and continuously encircling said end of the hose and the nipple therein, the ferrule at the end of the hose having a wall portion normal to the axis of the hose and an annular rounded bead portion extending axially outwardly with respect to said normal wall portion and merging smoothly into the cylindrical wall of said ferrule, a threaded nut swivelly connected to said nipple at the same end as said ferrule, a circumferential rib formed outwardly of said nipple between said nut and said ferrule wall portion and so positioned as to maintain said bead portion in spaced relation to said nut, the tubular nipple engaging the bore of the hose by outwardly expanded annular ribs at the ends and intermediate the ends of said nipple, and one of said latter ribs being so positioned as to contact the ferrule end wall portion and anchor it against said first mentioned rib.

DONALD L. SPENDER.
GEORGE G. HOWARD.

REFERENCES CITED

The following references are of record in the file of this patent:

UNITED STATES PATENTS

| Number | Name | Date |
|---|---|---|
| 2,142,752 | Howard | Jan. 3, 1939 |
| 2,216,839 | Hoffman | Oct. 8, 1940 |
| 2,228,018 | Scholtes | Jan. 7, 1941 |
| 2,338,666 | Nelson | Jan. 4, 1944 |